No. 748,284. PATENTED DEC. 29, 1903.
J. KARWOWSKI.
METHOD OF PRESERVING THE DEAD.
APPLICATION FILED OCT. 13, 1903.
NO MODEL.
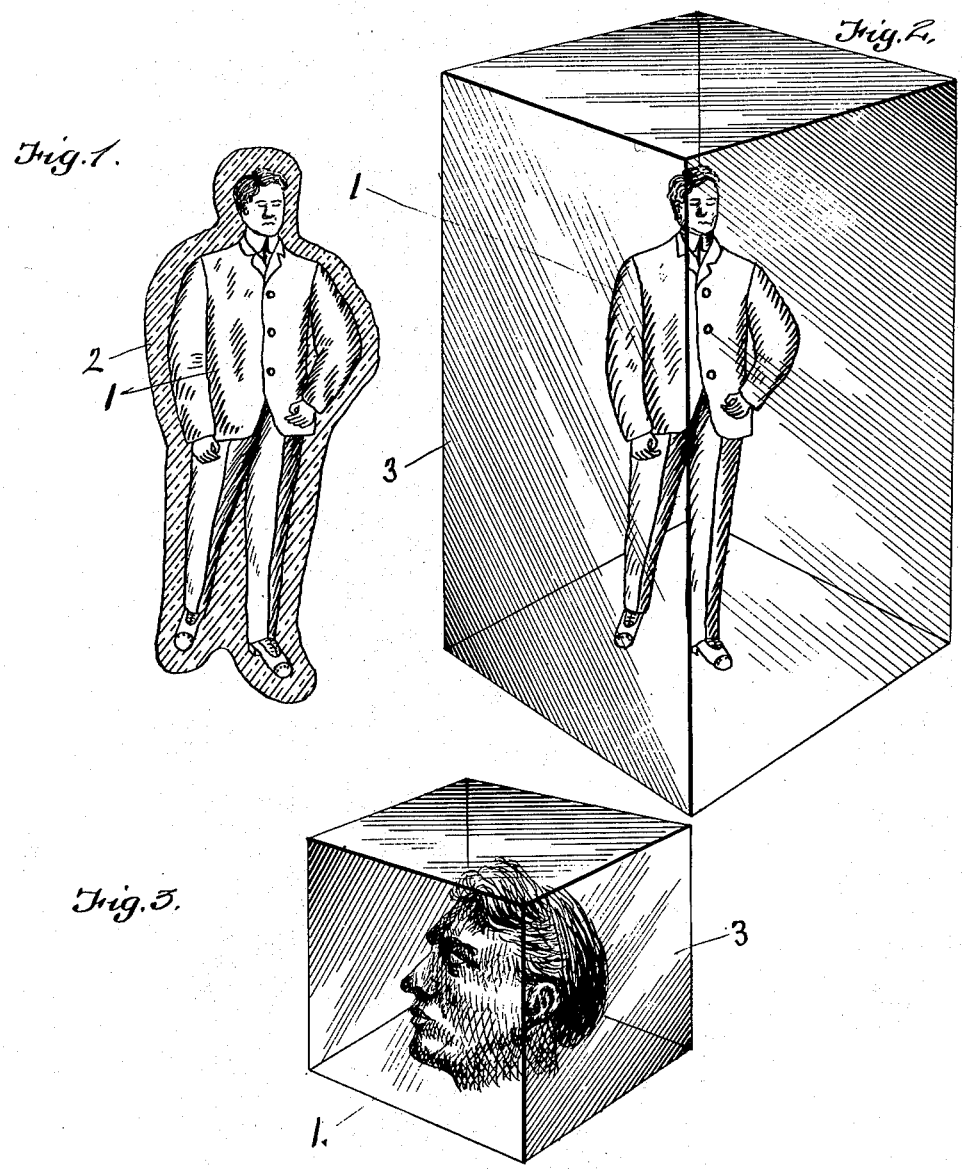
Witnesses
R. V. Boswell
A. L. Hough
Inventor
Joseph Karwowski,
By Franklin H. Hough
Attorney No. 748,284.

Patented December 29, 1903.

UNITED STATES PATENT OFFICE.

JOSEPH KARWOWSKI, OF HERKIMER, NEW YORK.

METHOD OF PRESERVING THE DEAD.

SPECIFICATION forming part of Letters Patent No. 748,284, dated December 29, 1903.

Application filed October 13, 1903. Serial No. 176,922. (No specimens.)

*To all whom it may concern:*

Be it known that I, JOSEPH KARWOWSKI, a subject of the Czar of Russia, residing at Herkimer, in the county of Herkimer and State of New York, have invented certain new and useful Improvements in Methods of Preserving the Dead; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in methods of preserving the dead; and it has for its object the provision of a means whereby a corpse may be hermetically incased within a block of transparent glass, whereby being effectually excluded from the air the corpse will be maintained for an indefinite period in a perfect and life-like condition, so that it will be prevented from decay and will at all times present a life-like appearance.

To this end and to such others as the invention may pertain the same consists in the steps of the process whereby this result is attained, all as more fully hereinafter described, shown in the accompanying drawings, and then specifically defined in the appended claims.

The invention is clearly illustrated in the accompanying drawings, which, with the figures of reference marked thereon, form a part of this specification, and in which—

Figure 1 is a front elevation of the corpse as it appears after the first step has been taken in carrying out my process. Fig. 2 is a perspective view of the completed glass block, showing the corpse incased therein; and Fig. 3 is a like view of the transparent block of glass, the same being shown as incasing a human head.

In carrying out my process I first surround the corpse 1 with a thick layer 2 of sodium silicate or water-glass. After the corpse has been thus inclosed within the layer of water-glass it is allowed to remain for a short time within a compartment or chamber having a dry heated temperature, which will serve to evaporate the water from this incasing layer, after which molten glass is applied to the desired thickness. This outer layer of glass may be molded into a rectangular form 3, as shown in Fig. 2 of the drawings, or, if preferred, cylindrical or other forms may be substituted for the rectangular block which I have illustrated. In Fig. 3 I have shown the head only of the corpse as incased within the transparent block of glass, it being at once evident that the head alone may be preserved in this manner, if preferred.

It will be at once noted that a body preserved in this way may be kept indefinitely, as the body being hermetically inclosed within the outer glass covering it will be impossible for air to reach it, and hence it will be effectually preserved from decay. The glass surrounding the corpse being transparent, the body will be at all times visible.

Having thus described my invention, what I claim as new, and desire to secure by Letters Patent, is—

1. The process of preserving the dead, which consists in first surrounding the corpse with a coating of sodium silicate or water-glass, and then surrounding the same with an outer coating of molten glass, substantially as shown and described.

2. The process of preserving the dead, which consists in first providing a corpse with a surrounding coating of sodium silicate, evaporating the water from the coating so applied, and afterward incasing the same in molten glass, substantially as described and for the purpose specified.

In testimony whereof I hereunto affix my signature in presence of two witnesses.

JOSEPH KARWOWSKI.

Witnesses:
 ALEXANDER JAWOVOSKI,
 TOZED TOWOVOWSKI.